United States Patent
Kramer et al.

(10) Patent No.: US 6,405,454 B1
(45) Date of Patent: Jun. 18, 2002

(54) METHOD AND APPARATUS FOR HEATING AND/OR DRYING FLOWABLE LOOSE MATERIAL

(75) Inventors: Walter Kramer, Kreuzlingen (CH); Holger Kühnau, Constance (DE); Gerd Bevier, Nafels (CH)

(73) Assignee: Motan Holding GmbH, Constance (DE)

( * ) Notice: Subject to any disclaimer, the term of this patent is extended or adjusted under 35 U.S.C. 154(b) by 0 days.

(21) Appl. No.: 09/390,603

(22) Filed: Sep. 3, 1999

(30) Foreign Application Priority Data

Sep. 4, 1998 (DE) .......................... 198 40 358

(51) Int. Cl.[7] ................................ F26B 17/00
(52) U.S. Cl. ........................ 34/586; 34/181; 34/187
(58) Field of Search ...................... 34/329, 330, 337, 34/343, 348, 351, 363, 378, 487, 576, 586, 587, 181, 182, 187, 201, 205; 423/210, 245.1, 245.3

(56) References Cited

U.S. PATENT DOCUMENTS

| | | | | |
|---|---|---|---|---|
| 3,558,111 A | * | 1/1971 | Avery | 34/362 |
| 3,629,954 A | * | 12/1971 | Lavlier | 34/169 X |
| 3,765,102 A | * | 10/1973 | Fischer | 34/136 |
| 4,149,844 A | * | 4/1979 | Noyes | 34/174 |
| 4,307,773 A | * | 12/1981 | Smith | 165/104.16 |
| 4,506,453 A | * | 3/1985 | Shirley, Jr. et al. | 34/362 |
| 4,914,834 A | * | 4/1990 | Sime | 34/169 |
| 5,277,880 A | * | 1/1994 | Sechrist et al. | 422/216 |
| 5,443,539 A | * | 8/1995 | Westlaken | 34/370 |
| 5,526,582 A | * | 6/1996 | Isaksson | 34/476 |
| 5,645,862 A | * | 7/1997 | Sable et al. | 425/73 |
| 5,659,974 A | * | 8/1997 | Graeff | 34/378 |
| 5,885,537 A | * | 3/1999 | DeMuynck | 423/210 |
| 5,915,814 A | * | 6/1999 | Crews | 34/166 |

* cited by examiner

Primary Examiner—Stephen Gravini
(74) Attorney, Agent, or Firm—Gudrun E. Huckett

(57) ABSTRACT

A method and device for heating and/or drying flowable loose material, especially granular polymeric material, that is to be conveyed to a processing machine, such as an injection molding machine, are provided. A hot air stream that has been heated up with a heating unit is caused to flow through loose material flowing in a chamber transverse to the direction of flow of the loose material in the chamber.

9 Claims, 7 Drawing Sheets

METHOD AND APPARATUS FOR HEATING AND/OR DRYING FLOWABLE LOOSE MATERIAL

BACKGROUND OF THE INVENTION

The present invention relates to a method and apparatus for heating and/or drying flowable loose material, preferably granular polymeric material, that is to be conveyed to a processing machine, preferably an injection molding machine.

During the processing of granular polymeric material, it is known to dry the granulate prior to feeding it to the processing machine. For this purpose, the granular polymeric material is temporarily stored in a drying hopper through which drying air flows from the bottom toward the top. As soon as the granular polymeric material is dried, it is conveyed to the processing machine. The drying temperature, however, is less than the desired material temperature at the inlet to the processing machine, which is generally an injection molding machine where the granular polymeric material is processed with a plasticizing conveyor screw. In this connection, considerable energy must be applied in order to be able to convert the granular polymeric material into the plasticized state. The energy requirement is correspondingly high, and the heating-up time is relatively long.

It is therefore an object of the present invention to provide a method and apparatus of the aforementioned general type whereby, however, the flowable loose material can be dried with little expenditure of energy within a very short period of time.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The method of the present invention is characterized primarily by causing a hot air stream to flow through flowing loose material transverse to the direction of flow of the loose material. In addition, the heating device of the present invention is characterized primarily by at least one flow chamber for the loose material, means for heating air to provide a hot air stream, and means for passing the hot air stream through the at least one flow chamber in a direction transverse to the direction of flow of the loose material in the flow chamber.

Pursuant to the method of the present invention, prior to being supplied to the processing machine the loose material is heated by the hot air stream to the maximum possible temperature within a very short period of time. The temperature is so great that if heating were to be conducted over a longer period of time damage could occur to the loose material. When the thus heated-up loose material passes into the processing machine, only little energy has to be supplied to the machine. The hot air stream flows transverse to the direction of flow of the loose material, which is thus optimally heated. A rapid heating-up is possible utilizing the hot air stream since a very large quantity of air can be supplied to the loose material. In this connection, the loose material advantageously flows continuously, so that after the drying process the processing of the loose material can be effected within a very short period of time.

The inventive method and device can advantageously also be utilized for the drying of the loose material. By means of the hot air stream that flows transversely through the loose material the loose material can be optimally dried.

Further specific features of the present invention will be described in detail subsequently.

DESCRIPTION OF PREFERRED EMBODIMENTS

Figure 1:
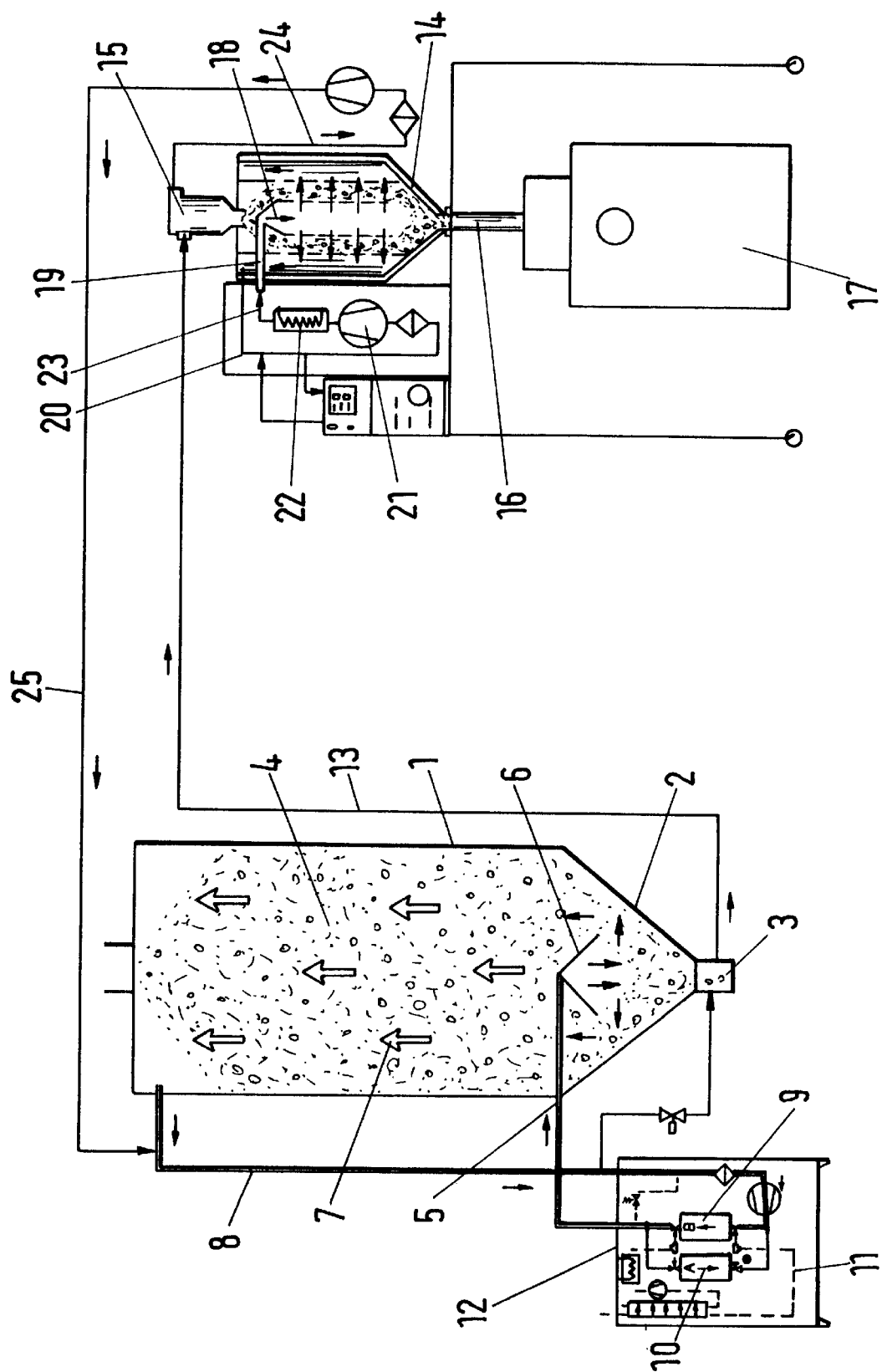
FIG. 1 illustrates a unit for drying and heating-up granular polymeric material and containing one exemplary embodiment of the inventive heating device.

Referring now to the drawings in detail, FIG. 1 shows a facility with which loose material, especially granular polymeric material, is dried, heated up and supplied to an injection molding machine with which injected molded parts are manufactured in a known manner from the granular polymeric material. By means of vacuum intake air or compressed air, the granular polymeric material is supplied from a non-illustrated supply container to a drying hopper 1. This hopper has a conically tapered lower end 2 with an outlet 3 for the dried loose material 4. Opening radially into the funnel-shaped end 2 is a supply line 5 via which the dry air is supplied to the lower end of the drying hopper 1. The supply line 5 ends centrally in the lower end 2 of the drying hopper 1. The free end of the supply line 5 is provided within the drying hopper 1 with a conical injection means 6 out of which the dry air initially flows downwardly into the loose material 4. The dry air flows upwardly through the loose material 4 in the direction of the flow arrows 7 and in so doing removes the moisture from the loose material 4. Connected near the upper end of the drying hopper 1 is a return line 8 via which the drying air, which is now charged with moisture, is supplied to a drying element 9 that absorbs the moisture contained in the drying air. The thus dehumidified air is returned to the drying hopper 1 via the supply line 5. In this manner, the loose material 4 that is located in the drying hopper 1 is dried in the circulation of drying air.

Provided parallel to the drying element 9 is at least one further drying element 10, which is regenerated in a known manner while the drying element 9 is connected in the described drying circuit. The drying element 10 is disposed in a regeneration circuit 11 in which in a known manner heated air flows that absorbs and removes the moisture present in the drying element 10. As soon as this drying element 10 is dried and cooled to the desired temperature, the drying element 9 that is disposed in the drying circuit can be switched to the regeneration circuit when it has been appropriately charged with moisture. The other drying element 10 is then connected into the drying circuit. This method of operation is known and will therefore not be described in any greater detail. The drying elements 9, 10 are components of a dryer 12.

The drying temperature is only great enough that the loose material 4 is optimally dried at as low a temperature as possible in an appropriate drying time. The drying temperature can. for example, be 120° C.

Due to the retention time in the hopper, the loose material 4 in the lowest region of the drying hopper 1 is dried and is supplied via a feed line 13 to a heating device 14. Seated on top of the heating device is a blower 15 to which is connected the feed line 13 and via which the dried loose material 4 is drawn to the heating device 14. In the heating device the dried loose material flows continuously downwardly to an outlet conduit 16 that is connected to an injection molding machine 17 that has a conventional configuration and contains a non-illustrated plasticizing screw conveyor with which the loose material 4 is plasticized in a known manner. During the continuous passage of the loose material 4 through the heating device 14 hot air 18 is supplied that is introduced into the heating device 14 transverse to the flow through direction of the loose material 4. The hot air 18 has such a high temperature that the continuously downwardly flowing loose material is heated to the desired high temperature in as short a time as possible. The time and the temperature are selected such that if the heating time were longer, damage to the loose material 4 would occur. The loose material 4 that enters the injection molding machine 17 thus already prior to entering the plasticizing screw conveyor has a relatively high temperature of, for example, 180 to 220° C. For this reason, less energy needs to be supplied to the plasticizing screw conveyor via the worm cylinder by means of heating strips, or by pressure and shearing forces.

The hot air 18 is supplied via an air inlet 19. After flowing through the loose material 4, the hot air passes into a return line 20 in which are disposed a blower 21 and a heating unit 22 that reheats the hot air to the temperature required for the rapid heating-up of the loose material 4. The air that is heated up in this manner passes into a supply line 23 that is connected to the air inlet 19. In this manner, the hot air 18 is circulated, so that only little energy is required for heating up the loose material 4.

The dry air drawn in by the blower 15. and via which the dried loose material 4 is conveyed from the drying hopper 1 to the heating device 14, flows back to the return line 8 of the drying hopper 1 via lines 24 and 25.

Figure 2:
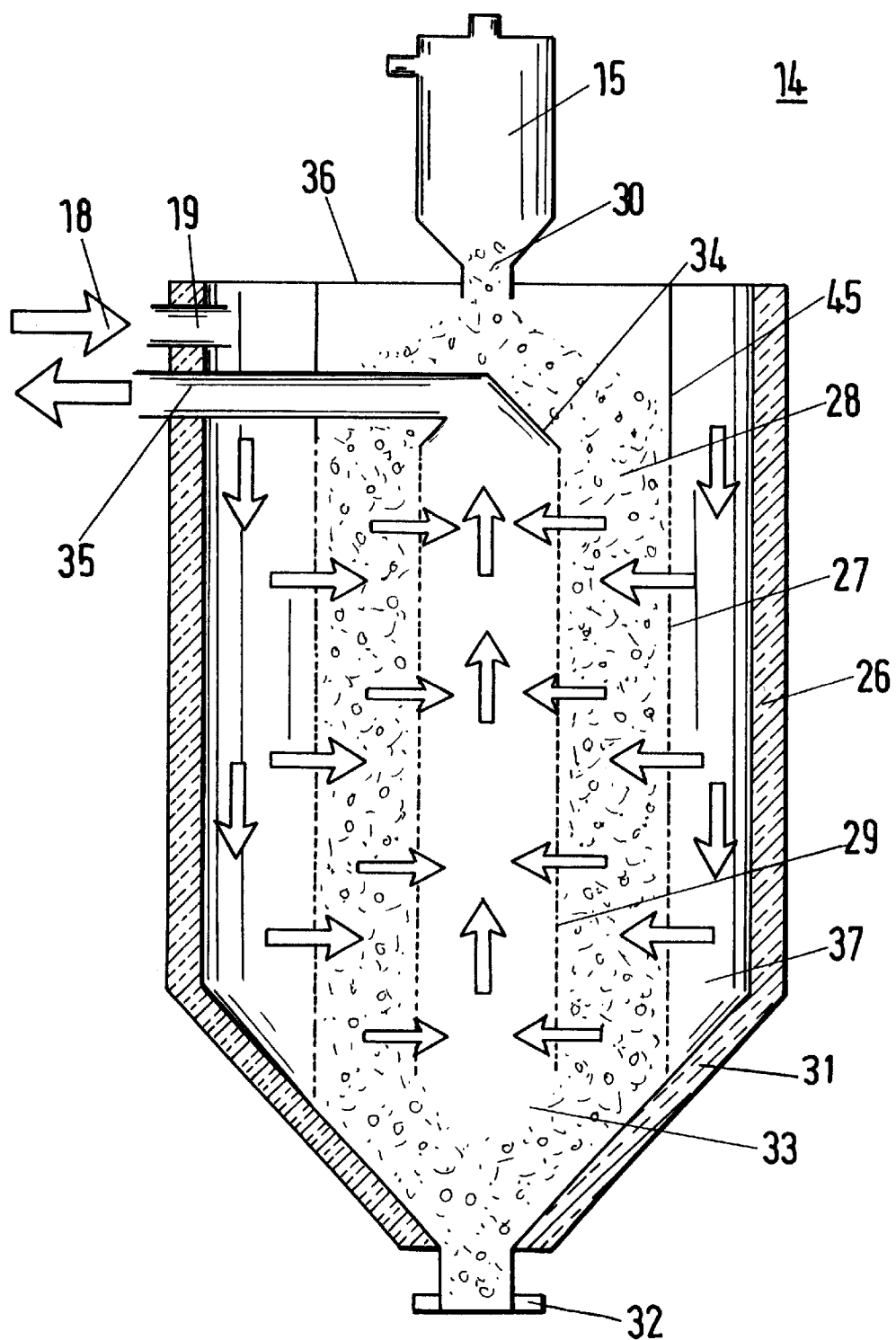
FIGS. 2 to 7 are each axial cross-sectional views of different embodiments of the inventive heating device.

FIG. 2 shows a first exemplary embodiment of the inventive heating device 14. This device has a casing 26 that is preferably embodied as an insulating casing. The casing advantageously has a circular cross-sectional configuration, but can also have any other suitable configuration. The casing 26 surrounds and is spaced from a tube 27 that has openings or apertures distributed over its periphery. The tube 27 is preferably formed by a perforated tube, the apertures of which have a diameter that is advantageously less than the diameter of the loose material 4 that is to be heated up. The tube 27 surrounds a conduit 29 accompanied by the formation of an annular chamber 28. The conduit 29 also has openings or apertures distributed over its periphery, and is preferably formed by a perforated conduit. The apertures of the conduit 29 also have a diameter that is preferably less than the diameter of the granulates of the loose material 4. The outer tube 27 extends to a cover or top 36 of the heating device 14 and surrounds and is spaced from an outlet 30 of the blower or conveyor 15, via which the loose material 4 dried in the drying hopper 1 is supplied. The lower end of the outer tube 27 adjoins a conical base 31 of the heating device 14; the base 14 tapers downwardly in a direction toward the outlet 32. Connected to this outlet is the outlet conduit 16 (FIG. 1) via which the loose material 4 passes to the injection molding machine 17. The bottom end 33 of the inner conduit 29 is closed. At the upper, closed end 34 the inner conduit 29 has a conically tapered configuration. As a result, the loose material 4, which flows out of the outlet 30 of the conveyor 15 with an angle of repose, is guided properly into the annular chamber 28. The inner conduit 29 forms a collection chamber for the hot air 18. The hot air 18 flows upwardly in the collection chamber to an outlet conduit 35 that extends radially from the end 34 and projects through the annular chamber 28 and the casing 26. The outlet conduit 35 is connected to the return line 20 (FIG. 1).

The air inlet 19 is disposed in the region between the outlet conduit 35 and the top 36 of the heating device 14. By means of the air inlet 19, the hot air 18 enters an annular chamber 37 that is delimited by the casing 26, a portion of the base 31 and a portion of the top 36, as well as by the outer tube 27. This annular chamber 37 forms a ring-shaped distributor for the hot air 18 which flows in via the air inlet 19. The hot air flows downwardly within the annular chamber 37 and, as indicated by the flow arrows, enters through the openings of the outer tube 27 into the annular chamber 28, where the loose material flows continuously downwardly to the outlet 32. The loose material 4 flows out of the annular chamber 28 at an angle of repose 33. The hot air 18, which flows transversely through the annular chamber 28, optimally heats the loose material 4 within the shortest possible time so rapidly that damage or plastification of the loose material 4 due to the high temperature is avoided. The speed with which the loose material 4 is heated up can be optimally adjusted by varying the output of the blower 15 and by the flow rate of the loose material in the annular chamber 28, the effective cross-sectional area of which can be varied. After flowing through the downwardly flowing loose material 4, the hot air 18 passes through the openings into the inner chamber of the conduit 29, where the hot air flows upwardly into the outlet conduit 35. In order to achieve an optimum heating of the loose material 4, the cylindrical portions of the two coaxially disposed tubes and conduits 27, 29 are provided with the openings or apertures for the hot air 18. The end 45 of the outer tube 27, which extends axially beyond the inner conduit 29 up to the top 36, has no openings for the hot air 18.

The hot air that flows via the outlet conduit 35 into the return line 20 is reheated to the required temperature by means of the heating unit 22 before this hot air is returned via the air inlet 19 into the annular chamber 37 of the heating device 14. In this way, the hot air 18 is constantly circulated, whereby the loose material 4 that continuously flows downwardly through the annular chamber 28 is heated up to the desired high temperature immediately prior to entry into the injection molding machine 17. In so doing, large quantities of air are circulated, so that within a very short period of time large quantities of energy can also be transferred to the loose material 4. The insulating casing 26 ensures that only little heat is given off outwardly into the room in which the heating device 14 is located.

Figure 3:
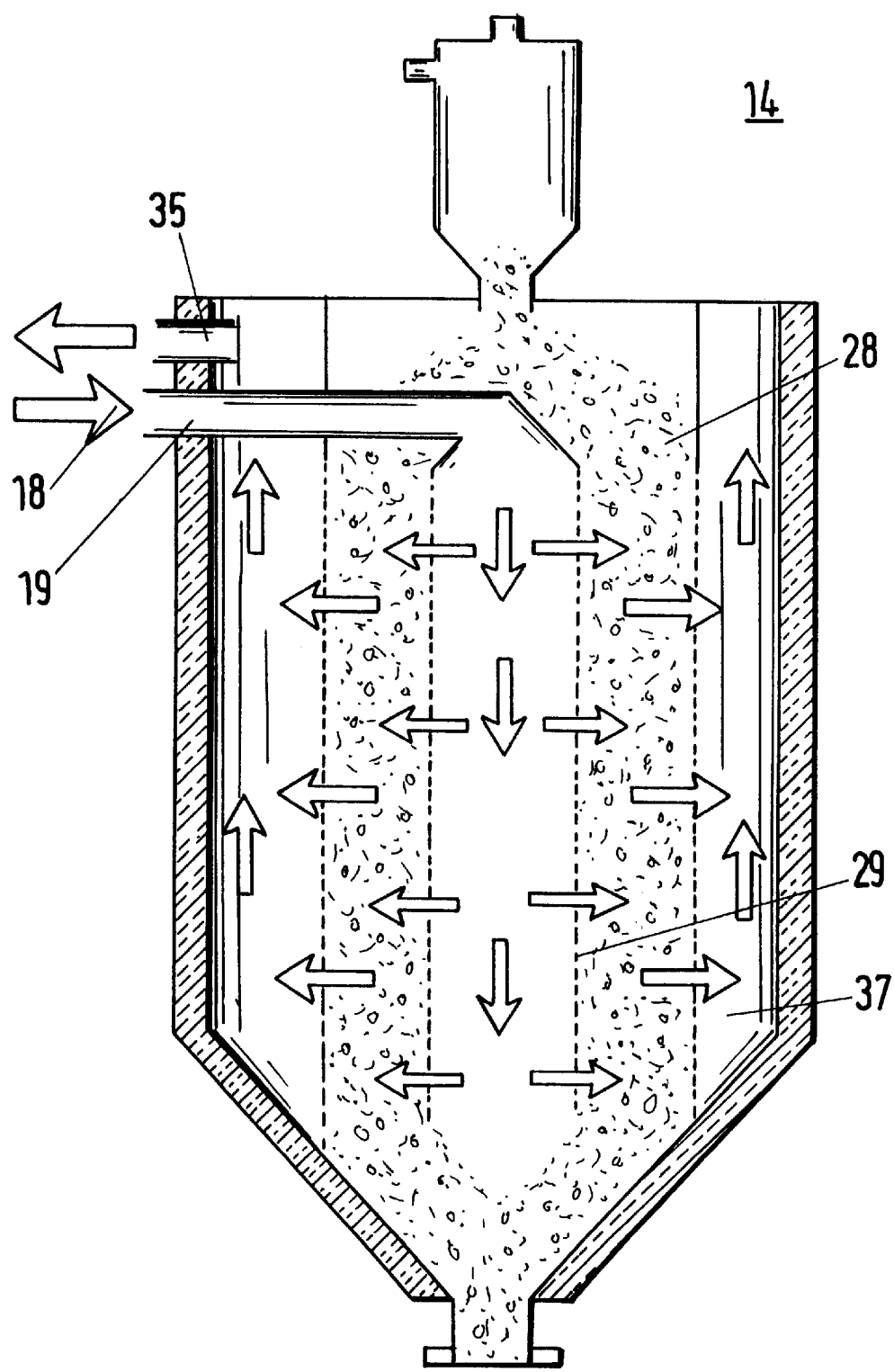

The embodiment illustrated in FIG. 3 differs from that of FIG. 2 merely in that the supply and return of the hot air 18 are reversed. In this embodiment, the hot air 18 flows via the conduit 19 directly into the inner conduit 29. Since the conduit 19 is disposed at the upper end of the inner conduit 29. the hot air 18 flows downwardly in the conduit 29. By means of the apertures, the hot air, as indicated by the flow arrows, flows transverse to the direction of flow of the loose material 4 in the annular chamber 28, whereby the continuously downwardly flowing loose material is rapidly heated up. After passing through the loose material 4, the hot air passes via the openings in the outer tube 27 into the annular chamber 37, where the hot air flows upwardly to the outlet 35, via which the hot air, which is drawn in by the blower 21 (FIG. 1), is conveyed to the heating unit 22, which heats up the hot air to the required temperature prior to its entry into the heating device 14. With this embodiment, the hot air thus flows radially from the inside to the outside, whereas the direction of flow in the embodiment of FIG. 2 is directed radially inwardly. In other respects, the embodiment of FIG. 3 has the same construction as does the previously described embodiment.

Figure 4:
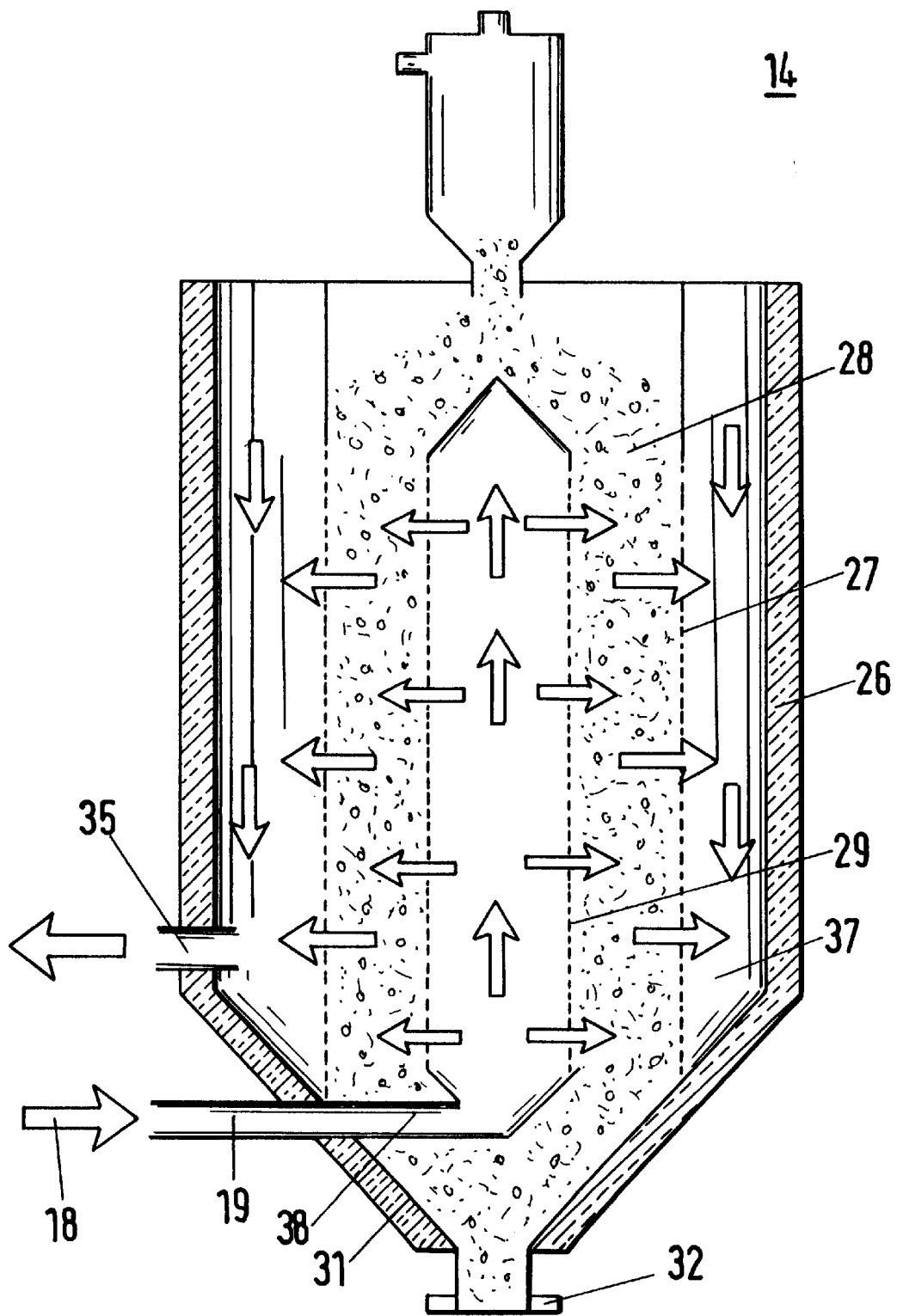

In the embodiment illustrated in FIG. 4, the inlet and the outlet for the hot air 18 are disposed at the lower end of the heating device 14. The air inlet 19 is provided at the conical base 31 of the heating device 14. The conduit 38 that is connected to the air inlet 19 passes through the two tubes or conduits 27, 29, so that the hot air that is supplied via the conduit 38 passes into the interior of the conduit 29, from where the hot air flows upwardly in the conduit 29. By means of the openings of the inner conduit 29, the hot air flows radially outwardly, whereby it heats up the loose material that continuously flows downwardly in the annular chamber 28. By means of the apertures in the outer tube 27, the hot air passes into the annular chamber 37 between the casing 26 and the outer tube 27. In this annular chamber 37, the hot air flows downwardly to the air outlet 35, which is disposed approximately at the transition from the cylindrical casing 26 into the conical base 31, and to which is connected the return line 20, by means of which the hot air 18 passes to the blower 21 and to the subsequent heating unit 22, which heats up the hot air to the required temperature prior to its introduction into the heating device 14. Also in this embodiment. the hot air 18 is circulated and heats the loose material that continuously flows downwardly to the outlet 32 of the heating device 14 to the desired high temperature.

It is also possible to supply the hot air via the conduit 20, so that the hot air flows upwardly in the annular chamber 37 and via the apertures of the outer tube 27 flows radially inwardly into the annular chamber 28. In this case, the hot flows radially inwardly through the loose material 4 that continuously flows downwardly in the annular chamber 28, and then the hot air passes via the openings of the inner conduit 29 into the interior chamber thereof. From there, the hot air flows downwardly to the conduit 38, via which it is guided outwardly to the blower 21 and to the heating unit 22.

Figure 5:
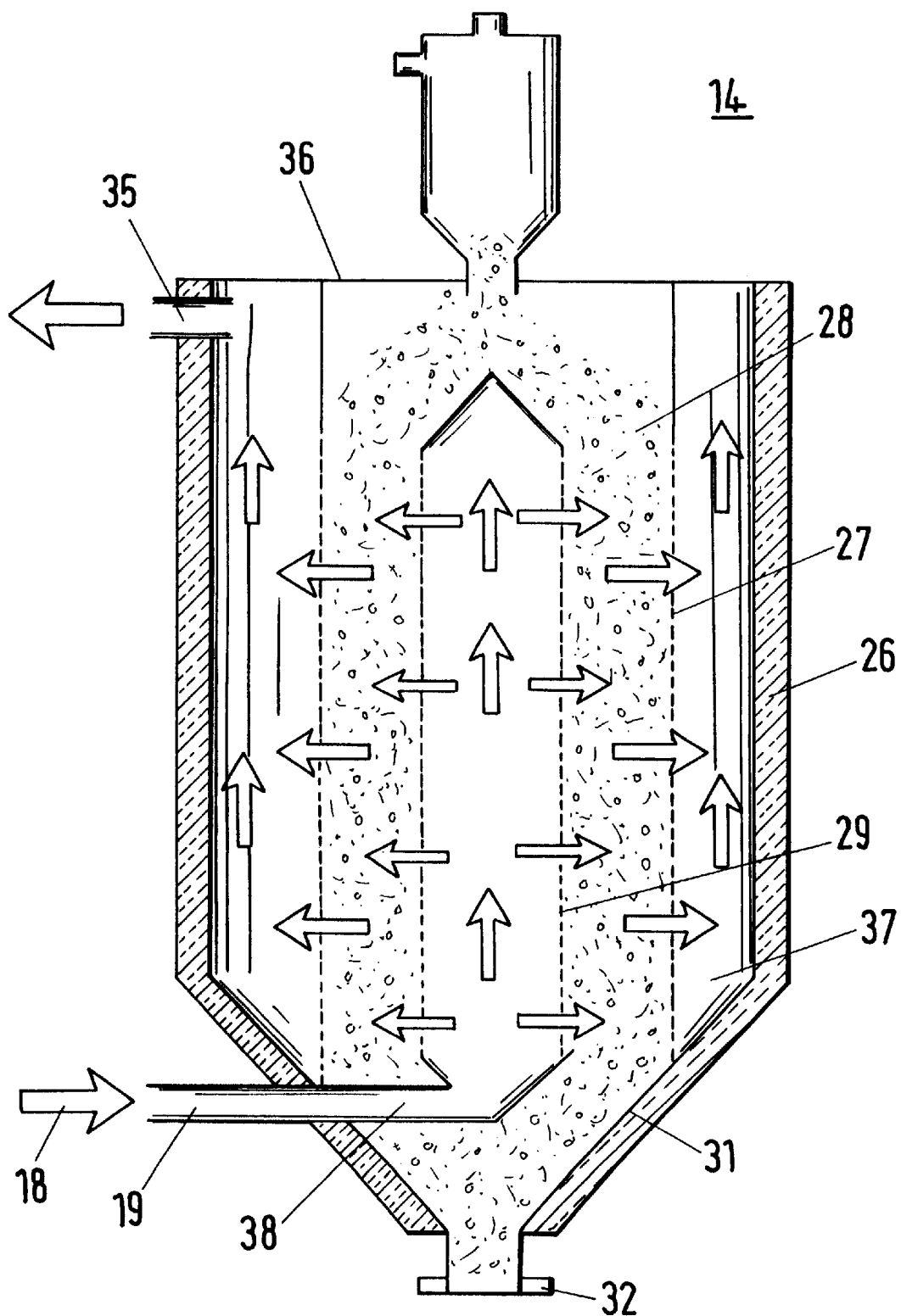

In the embodiment illustrated in FIG. 5, the air inlet 19 is disposed in the region of the conical base 31 of the heating unit 14 close to the cylindrical casing 26. By means of the air inlet 19, the hot air 18 passes into the conduit 38, which extends radially through the outer tube 27 and the annular chamber 28, and opens into the interior chamber of the inner conduit 29. The hot air then flows upwardly and passes radially into the annular chamber 28 via the openings of the inner conduit 29. The constantly vertically downwardly flowing loose material 28 is heated by the hot air that flows transversely through the loose material. The hot air 18 passes through the apertures of the outer tube 27 into the annular chamber 37, in which the hot air flows upwardly to the outlet conduit 35, which is spaced slightly below the top 36 of the heating device 14 in the casing 26. From the outlet conduit 35 the hot airflows into the return line 20. The blower 21 (FIG. 1) draws the hot air in and circulates it in the manner described in conjunction with the previous embodiments. Prior to reentering the heating device 14, the hot air 18 is heated up in the heating unit 22.

Figure 6:
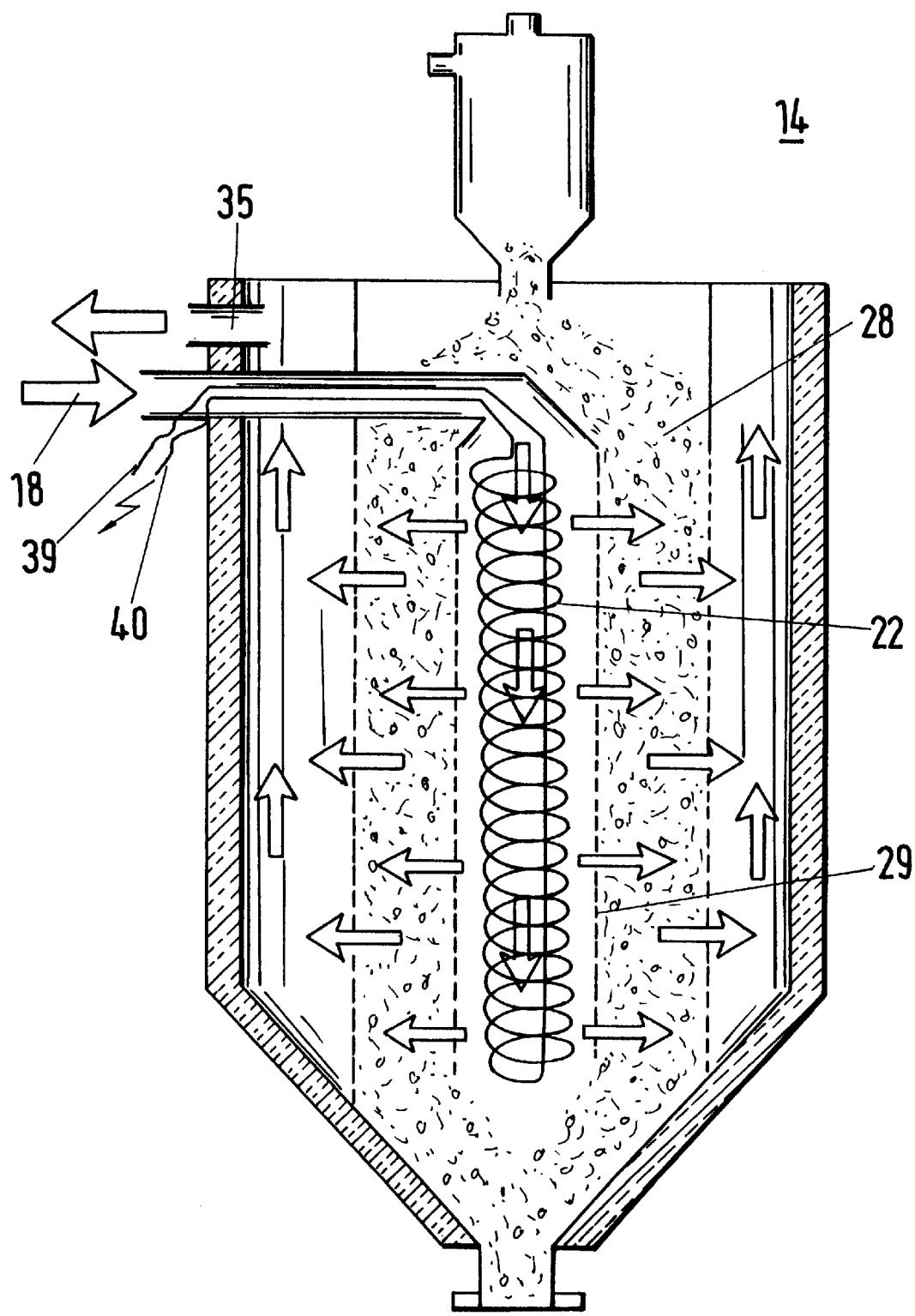

In the embodiment illustrated in FIG. 6, rather than being disposed externally of the heating device 14 the heating unit 22 is disposed within the inner conduit 29. In other respects, the heating device 14 has the same construction as does the embodiment of FIG. 3. The leads 39, 40 of the heating unit 22 are guided outwardly through the air inlet 19. The hot air 18 that flows into the inner conduit 29 via the conduit 19 is heated up to the required temperature by the heating unit 22 immediately prior to passing through the openings in the inner conduit 29. Since the heating unit 22 is accommodated in the inner conduit 29, a very compact construction of the heating device 14 is provided.

To ensure an optimum heating of the hot air 18, the heating unit 22 extends nearly to the bottom end of the inner conduit 29. The heating unit 22 advantageously has a helical configuration. The spiral is adequately spaced from the inner wall of the conduit 29, so that a direct heating of the loose material 4 that flows downwardly in the annular chamber 28 by the heating unit 22 is avoided.

It should be noted that also with the other previously described embodiments the heating unit 22 could be accommodated in the inner conduit 29.

Figure 7:
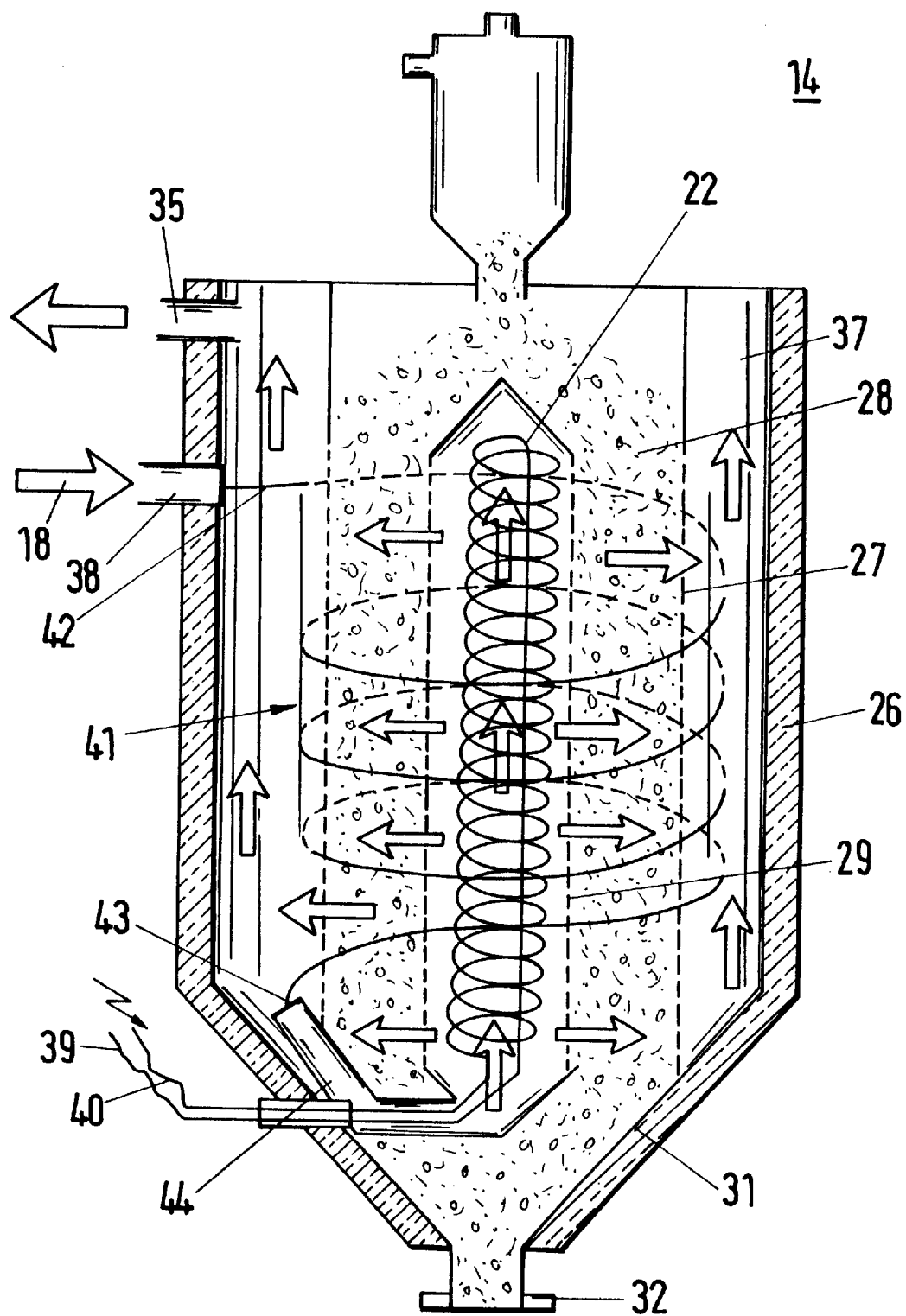

FIG. 7 shows an embodiment where the heating device 14 is provided with a heat exchanger 41 in addition to the heating unit 22. Connected to the inlet conduit 38 for the hot air 18 is a hose 42 that extends through the casing 26 and surrounds the outer tube 27 in a spiral manner. The air inlet conduit 38 is disposed in the upper half of the outer tube 27. Near the bottom end of the outer tube 27, within the annular chamber 37, there is provided an inlet connector 43 to which the hose 42 is connected. The inlet connector 43 is part of a conduit 44 that passes through the outer tube 27 and the annular chamber 28, and that is closed off toward the outside by the base 31 of the heating device 14. The hot air 18 that flows downwardly in the hose 42 passes via the conduit 44 into the inner conduit 29, in which the hot air flows upwardly. By means of the openings in the inner conduit 29, the hot air flows radially into the annular chamber 28, in which the loose material 4 flows continuously downwardly to the outlet 32. As was the case with the previously described embodiments, the loose material 4 is heated over nearly the entire height of the cylindrical portion of the annular chamber 28 by the hot air 18 that flows transversely to the direction of flow of the loose material. By means of the apertures in the outer tube 27, the hot air passes into the annular chamber 37, in which it flows upwardly to the air outlet 35. The hose 42 is disposed entirely within the annular chamber 37, so that heat exchange occurs between the hot air that is in the hose 42 as well as the hot air that flows in the annular chamber 37. The helical hose 42 is guided through the outer tube 27. It is to be understood that in place of the hose 42, a helical, metallic conduit could also be provided.

Accommodated in the inner conduit 29 is the helical heating unit 22, the leads 39, 40 of which are guided outwardly through the conduit 44 as well as sealingly through the base 31. After leaving the conduit 44, and prior to entering the annular chamber 28, the hot air is optimally heated by the heating unit 22.

It is, of course, also possible to dispose the heating unit 22 in the annular chamber 37 and to dispose the heat exchanger 41 with the hose 42 in the inner conduit 29.

It is also possible to dry the loose material 4 with the heating devices 14 that have been described and illustrated. In such a case, the heating device 14 can be used in place of the drying hopper 1 (FIG. 1) or can itself form a drying hopper.

The present invention is, of course, in no way restricted to the specific disclosure of the specification and drawings, but also encompasses any modifications within the scope of the appended claims.

What is claimed is:

1. A heating device for flowable loose material, comprising:
   an outer casing surrounding and spaced from an intermediate tube, said intermediate tube surrounding and spaced from an inner conduit, wherein said outer casing and said intermediate tube delimit a first annular chamber for hot air and wherein said intermediate tube and said inner conduit delimit a second annular chamber for said flowable loose material, wherein said first annular chamber for the hot air extends over an entire height of the flowable loose material in the second annular chamber, said flowable loose material in the second annular chamber flowing in a single direction which is transverse to a flow direction of the hot air; and a hot air chamber surrounded by said the inner conduit, said inner conduit and said intermediate tube provided with openings for a flow of hot air, wherein the hot air flow is supplied through at least one supply conduit which flows through the outer casing, wherein the hot air is led to a heating unit by at least one outlet after flowing through said flowable loose material, said hot air being heated prior to being returned to said supply conduit.

2. A heating device according to claim 1, wherein said heating unit is disposed externally of said heating device.

3. A heating device according to claim 1, wherein said heating unit is disposed in said inner conduit.

4. A heating device according to claim 1, wherein said heating unit is disposed in said first annular chamber.

5. A heating device according to claim 1, which includes a heat exchanger.

6. A heating device according to claim 5, wherein said heat exchanger is a helical line that is connected to an inlet for hot air.

7. A heating device according to claim 6, wherein said helical line surrounds said outer casing and is disposed in said first annular chamber.

8. A heating device according to claim 6, wherein said helical line is disposed in said inner conduit.

9. A heating device according to claim 1, which is seated on a processing machine.

* * * * *